United States Patent [19]

Sakai et al.

[11] Patent Number: 5,358,781

[45] Date of Patent: Oct. 25, 1994

[54] HEAT INSULATING PLATE COMPRISING SYNTHETIC PAPER SHEETS AND METAL FILMS

[75] Inventors: Takeo Sakai, Okazaki; Tsuneo Kawamura, Yokkaichi, both of Japan

[73] Assignee: Somar Corporation, Japan

[21] Appl. No.: 793,515

[22] Filed: Nov. 18, 1991

[30] Foreign Application Priority Data

Nov. 30, 1990 [JP] Japan .................. 2-337241

[51] Int. Cl.$^5$ .............................. B32B 15/00
[52] U.S. Cl. ........................ 428/285; 428/287; 428/477.7; 428/458; 428/216; 162/157.3
[58] Field of Search ............... 428/284, 285, 287, 458, 428/477.7; 162/157.3

[56] References Cited

U.S. PATENT DOCUMENTS

| | | | |
|---|---|---|---|
| 3,647,606 | 3/1972 | Notaro | 428/285 |
| 3,756,908 | 9/1973 | Gross | 162/146 |
| 3,767,500 | 10/1973 | Tally et al. | 156/184 |
| 3,878,316 | 4/1975 | Groff | 174/258 |
| 4,061,898 | 12/1977 | Murray et al. | 219/211 |
| 4,323,620 | 4/1982 | Iwabuchi et al. | 428/215 |
| 4,416,949 | 11/1983 | Gabellieri et al. | 428/461 |
| 4,543,295 | 9/1985 | St. Clair et al. | 428/458 |
| 4,698,267 | 10/1987 | Tokarsky | 428/474.4 |
| 4,777,086 | 10/1988 | Madden et al. | 428/285 |

FOREIGN PATENT DOCUMENTS 2749764  7/1977  Fed. Rep. of Germany .

OTHER PUBLICATIONS

Patent Abstracts of Japan, vol. 5, No. 172, 31 Oct. 1981.
Database WPIL #89-013314(02).
Patent Abstracts of Japan, vol. 15, No. 105, 13 Mar. 1991.

*Primary Examiner*—George F. Lesmes
*Assistant Examiner*—Chris Raimund
*Attorney, Agent, or Firm*—Lorusso & Loud

[57] ABSTRACT

Disclosed is a heat insulating plate including a plurality of superposed, heat-resisting, synthetic paper sheets integrally bonded with each other, and one or more metal films interposed between adjacent two of the plurality of synthetic paper sheets.

13 Claims, 1 Drawing Sheet

HEAT INSULATING PLATE COMPRISING SYNTHETIC PAPER SHEETS AND METAL FILMS

BACKGROUND OF THE INVENTION

This invention relates to a heat insulating material in the form of a plate or sheet.

Heat insulators are generally used for minimizing energy loss or for protection from heat damage caused by heat transfer by conduction. In an injection molding machine, for example, a heat insulator is provided between each of a pair of male and female molds and the corresponding supporting plate so as to minimize the loss of thermal energy by heat transfer from the molds to the supporting plates.

PRIOR ART

Asbestos has been used in the past for forming heat insulators but is not now because of harmfulness to human beings. Insulator plates formed of a phenol resin are known. The phenol resin plates are, however, not satisfactory because the heat conductivity thereof is not sufficiently low and because cracks are apt to be formed during formation of slots or perforations to be used for bolting or during bolting operations for assembly of two parts between which the insulator is interposed.

SUMMARY OF THE INVENTION

The present invention is aimed at the provision a novel, heat insulating material which has good processability, good dimensional stability, good heat insulating property, high mechanical strengths and light weight. In accordance with the present invention there is provided a heat insulating plate comprising a plurality of superposed, heat-resisting, synthetic paper sheets integrally bonded with each other, and one or more metal films interposed between adjacent two of said plurality of synthetic paper sheets.

BRIEF DESCRIPTION OF THE DRAWINGS

The present invention will now be described in detail below with reference to the accompanying drawings, in which the FIG. 1 is a cross-sectional view schematically showing an example of heat insulator according to the present invention

DESCRIPTIONS OF THE PREFERRED EMBODIMENTS

Figure 1:
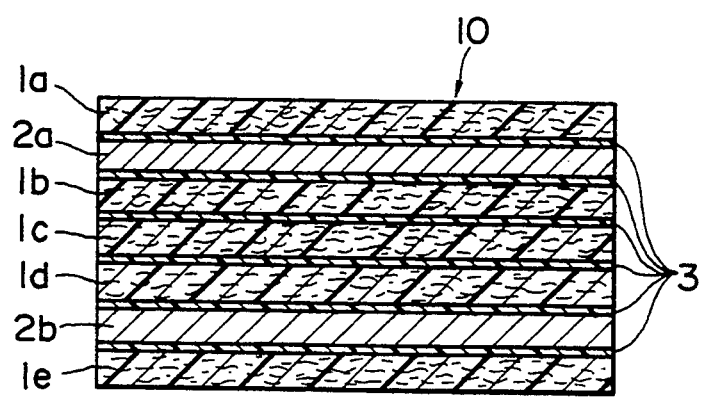

Referring to FIG. 1, designated generally as 10 is a heat insulating plate according to the present invention. The plate 10 includes a plurality (five in the specific embodiment shown) of superposed, heat-resisting, synthetic paper sheets 1a through 1e.

Each of the synthetic paper sheets 1a through 1e is preferably formed of an aromatic polyamide or polyimide having a melting point of at least 200° C., more preferably at least 250° C. Non-fusible aromatic polyamide or polyimide may also be preferably used. Preferred paper sheet may be a nonwoven mixture of fibrids of an aromatic polyamide and short fibers (floc) of an aromatic polyamide, such as disclosed in U.S. Pat. No. 3,756,908, the disclosure of which is hereby incorporated by reference. Preferably, the "short fibers" have a length of less than one inch and a denier of 0.5 to 10. The fibrids are preferably produced in a fibridating apparatus wherein the aromatic polyamide or polyimide is sheared as it precipitates from solution. An inorganic filler such as talc may be incorporated into the paper sheet, if desired. Further, it is preferred that the paper sheet be calendered by application of pressure and temperature to provide smooth, compact surface.

It is preferred that a number of thin paper sheets be used for reasons of improved insulation. Thus, the use of at least 5, more suitably 7–15 paper sheets each having a thickness of 1 mm or less, more suitably 0.01–0.5 mm is preferred.

One or more metal films (two metal films 2a and 2b in the specific example shown) are interposed between the paper sheets (between paper sheets 1a and 1b and between 1d and 1e in the specific embodiment shown). Each of the metal films 2a and 2b may be formed of aluminum, copper or any other suitable metal and preferably has a thickness of 0.01–0.5 mm, more preferably 0.05–0.3 mm.

By providing the metal film or films 2a and 2b in the stacked paper sheets 1a–1e, moisture is prevented from passing therethrough so that the moisture absorption power of the heat insulting plate 10 of the present invention can be lowered. As a result, hygroscopic expansion of the insulating plate 10 can be minimized. Such a moisture barrier characteristic of the metal films also contributes to an improvement in heat insulating property of the plate 10, since moisture absorbed in pores of the synthetic paper sheets causes an increase in heat conductivity of the sheets.

An insulating plate without such a metal film or film 2a and 2b has a tendency to expand by absorption of moisture when allowed to stand for a long period of time in air or when subjected to a humid environment. Especially, elongation in the machine direction of the stacked paper sheets becomes often about 2%. Such a hygroscopic expansion may cause dimensional inaccuracy of the insulating plate so that there encounters a problem that the openings of the insulating plate do not fit with the bolt holes of parts to be joined. The insulating plate having no metal films has an additional drawback that it tends to warp.

The above problems have been overcome in the insulting plate 10 according to the present invention by using the metal films 2a and 2b. For reasons of obtaining good dimensional stability, it is preferred that two metal films 2a and 2b be located in both upper and lower portions, respectively, of the stacked paper sheets 1a–1e. The most preferable embodiment is as shown in the FIG. 1 in which the number (n) of the paper sheets is not smaller than 5, in which the number of the metal film is at least 2, and in which one 2a of the at least two metal films is positioned between the first and second paper sheets 1a and 1b with the other metal film 2b being positioned between the n-th and the (n-1)th paper sheets 1e and 1d. In addition to the metal films positioned in the upper and lower part of the insulating plate 10, one or more intermediate metal films may be provided, if desired. However, the use of a number of the metal films is not advantageous because the weight of the resulting insulating plate is increased and because no additional merits are obtainable.

Designated as 3 are heat resisting adhesive layers for integrally bonding the paper sheets 1a–1e and the metal films 2a and 2b. The heat resisting adhesive may be, for example, a polyimide-containing composition, a polyetherimide-containing composition, an epoxy resin-containing composition or a phenol resin-containing composition.

The insulating plate may be manufactured by superimposing desired numbers of paper sheets and metal foils in desired order, while applying an adhesive composition between them. The resulting laminate is placed between hot pressure plates and is heated under pressure for curing the adhesive layers. The thus prepared plate is cut and punched to form an insulator plate. The thickness of the insulating plate is generally at least 2 mm, preferably 3–10 mm.

Figure 2:
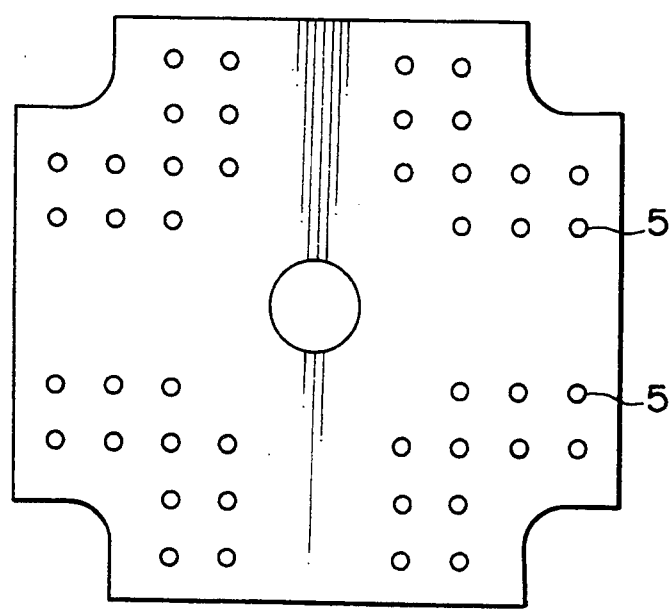
FIG. 2 is a plan view showing an example of an insulator.

The heat insulating plate according to the present invention has low heat conduction, high mechanical strengths and low moisture absorption and, therefore, exhibits excellent heat insulating property, excellent dimensional stability and excellent machinability. Namely, since the synthetic paper sheet has a porous structure, the heat conductivity is low. Further, since the metal film can prevent passage of moisture therethrough and can disperse the heat along the plane thereof, the heat insulating property is further improved.

since the insulating plate is formed from thin metal films and synthetic resins, the machinability thereof is excellent so that the insulating plate can be easily cut into a desired complicated shape such as shown in FIG. 2 by ordinary methods such as by laser beam machining and can be punched to form perforations 5 without causing cracks. Further, the insulating plate has little tendency to curl or warp and is low in hygroscopic expansion. Thus, the insulating plate is suitably used as an insulator provided, for example, between a part which is subjected to a high temperature and a support plate to which the part is to be thermally insulatingly secured.

The following examples will further illustrate the present invention.

EXAMPLE 1

Nine (9) sheets of synthetic papers (NOMEX 410, registered trademark of du Pont Inc., calendered aromatic polyamide paper) each having a thickness of 380 um and two (2) sheets of aluminum foils were superimposed while applying an epoxy resin adhesive between each adjacent two sheets to obtain a stacked body. The aluminum foils were positioned next to the bottom and top paper sheets. The stacked body was then pressed with heating to obtain a heat insulating laminated plate having a thickness of about 3.5 mm. The plate was found to have a thermal conductivity of about $3 \times 10^{-4}$ cal/cm·sec·°C., a specific gravity of 1.0 and a compressive strength of 2000 kg/cm$^2$ and to withstand heating at 250° C. The thus obtained plate was then cut into a shape as shown in FIG. 2 by means of an NC turret punch apparatus and was processed with laser beam machining to form a number of perforations 5 as shown in FIG. 2. The resulting insulator plate had smooth cut lines and no cracks or deformation were caused. A mold of an injection molding machine was mounted to a supporting plate using bolts and nuts with the above insulator plate being interposed therebetween. The injection molding was then performed using the molding machine. Remarkable energy saving was attained because of the use of the insulator plate.

EXAMPLE 2

An insulating plate was prepared in the same manner as that in Example 1 and was tested for the hygroscopic expansion thereof. Thus, the plate was allowed to stand at a temperature of 55° C. and a relative humidity of 80% for 24 hours to measure the elongation which is calculated as follows:

$$\text{Elongation } (\%) = (L_1 - L_0)/L_0 \times 100$$

where $L_1$ and $L_0$ are the lengths of the test sample after and before the test.

The insulating plate showed an elongation of 0.4%.

COMPARATIVE EXAMPLE

An insulating plate was prepared in the same manner as that in Example 1 except that no aluminum films were used. The insulating plate had a thickness of 3.2 mm and showed an elongation of 0.8%.

What is claimed is:

1. A heat insulating plate comprising a plurality of superposed, heat-resisting, synthetic paper sheets integrally bonded with each other, each of said paper sheets having an open porous structure for providing heat insulation and being a nonwoven mixture of fibrids and short fibers of an aromatic polyamide or polyimide, and one or more films of a metal selected from the group consisting of aluminum and copper and interposed between an adjacent pair of said plurality of synthetic paper sheets.

2. A heat insulating plate as claimed in claim 1, wherein the number of said metal films is at least two and wherein two of said metal films are positioned adjacent to the uppermost and lowermost synthetic paper sheets of said insulating plate, respectively.

3. A heat insulating plate as claimed in claim 1, wherein the number of said paper sheets is n which is an integer between 7 and 15 and wherein the number of said metal film is at least 2, one of said at least two metal films being positioned between the first and second paper sheets with the other metal film being positioned between the n-th and the (n-1)th paper sheets.

4. A heat insulating plate as claimed in claim 1, wherein each of said paper sheets has a thickness of 0.01–0.5 mm and the thickness of each of said metal films is 0.01–0.5 mm.

5. A heat insulating plate as claimed in claim 1, wherein both sides of each of said paper sheets are calendered.

6. A heat insulating plate as claimed in claim 1, wherein said metal films are formed of an aluminum.

7. A heat insulating plate as claimed in claim 1, and having a thickness in the range of 3–10 mm.

8. A heat insulating plate as claimed in claim 1, wherein said synthetic paper sheets and said metal films are integrally bonded with each other using a heat-resisting adhesive.

9. A heat insulating plate as claimed in claim 2 wherein said metal films are two in number.

10. A heat insulating plate as claimed in claim 1 wherein said short fibers have a length of less than one inch and a denier of 0.5 to 10.

11. A heat insulating plate as claimed in claim 10 wherein said fibrids are produced in a fibridating apparatus wherein the aromatic polyamide or polyimide is sheared as it precipitates from solution.

12. A heat insulating plate as claimed in claim 1 wherein said short fibers have a length of less than one inch and a denier of 0.5 to 10.

13. A heat insulating plate as claimed in claim 11 wherein said fibrids are produced in a fibridating apparatus wherein the aromatic polyamide or polyimide is sheared as it precipitates from solution.

* * * * *